(12) United States Patent
Meng et al.

(10) Patent No.: US 11,333,819 B2
(45) Date of Patent: May 17, 2022

(54) BACKLIGHT ASSEMBLY, A DISPLAY DEVICE AND A DRIVING METHOD THEREOF

(71) Applicant: BOE Technology Group Co., Ltd., Beijing (CN)

(72) Inventors: Xiandong Meng, Beijing (CN); Wei Wang, Beijing (CN); Xianqin Meng, Beijing (CN); Qiuyu Ling, Beijing (CN); Jifeng Tan, Beijing (CN); Xiaochuan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 81 days.

(21) Appl. No.: 16/771,212

(22) PCT Filed: Oct. 21, 2019

(86) PCT No.: PCT/CN2019/112161
§ 371 (c)(1),
(2) Date: Jun. 9, 2020

(87) PCT Pub. No.: WO2020/143266
PCT Pub. Date: Jul. 16, 2020

(65) Prior Publication Data
US 2020/0379157 A1    Dec. 3, 2020

(51) Int. Cl.
*G02F 1/1335* (2006.01)
*F21V 8/00* (2006.01)
(Continued)

(52) U.S. Cl.
CPC ........... *G02B 6/005* (2013.01); *G02B 6/0031* (2013.01); *G02B 6/0036* (2013.01);
(Continued)

(58) Field of Classification Search
CPC ............. G02F 1/1335; G02F 1/133504; G02F 1/133553; G02F 1/1336; G02F 1/133605;
(Continued)

(56) References Cited

U.S. PATENT DOCUMENTS

2008/0297696 A1* 12/2008 Banerjee .............. G02B 5/3058
349/65
2016/0070136 A1    3/2016 Jang et al.
(Continued)

FOREIGN PATENT DOCUMENTS

CN      106959550 A    7/2017
CN      106990602 A    7/2017
(Continued)

OTHER PUBLICATIONS

CN201910011986_OA1.
(Continued)

*Primary Examiner* — Thoi V Duong
(74) *Attorney, Agent, or Firm* — IPRO, PLLC

(57) ABSTRACT

Disclosed includes a backlight assembly, a display device including such a backlight assembly and a method of obtaining backlight. The backlight assembly may comprise a light guide, a first grating on a first surface of the light guide and a light direction adjuster on a side of the first grating away from the light guide. The first grating may have a diffraction direction slanted relative to a thickness direction of the light guide and the light direction adjuster may be configured to change diffractive light coming from the first grating to a target direction.

18 Claims, 3 Drawing Sheets

(51) Int. Cl.
*G02F 1/133* (2006.01)
*G09G 3/36* (2006.01)
*G02F 1/13357* (2006.01)

(52) U.S. Cl.
CPC ........... *G02F 1/13306* (2013.01); *G09G 3/36* (2013.01); *G02F 1/133606* (2013.01)

(58) Field of Classification Search
CPC ......... G02F 1/133606; G02F 1/133607; G02F 1/133615; G02F 1/13306; G02B 6/005; G02B 6/0031; G02B 6/0036; G02B 6/0056; G02B 6/0065; G02B 6/0028; G02B 5/18; G09G 3/36
See application file for complete search history.

(56) References Cited

U.S. PATENT DOCUMENTS

| 2018/0052330 | A1 | 2/2018 | Wang et al. |
| 2019/0094449 | A1 | 3/2019 | Ma et al. |
| 2020/0379157 | A1 | 12/2020 | Meng et al. |
| 2021/0011213 | A1 | 1/2021 | Meng et al. |

FOREIGN PATENT DOCUMENTS

| CN | 108710240 | A | 10/2018 |
| CN | 109031736 | A | 12/2018 |
| CN | 109541850 | A | 3/2019 |
| CN | 107608134 | B | 7/2019 |
| CN | 106662700 | B | 10/2019 |
| CN | 107515439 | B | 10/2019 |
| EP | 3175267 | B1 | 12/2020 |
| JP | 2011112831 | A | 6/2011 |

OTHER PUBLICATIONS

CN201910011986_OA1_translation.
CN201910011986-search-report.
WO2020143266-ISR.
WO2020143266-WOSA.

\* cited by examiner

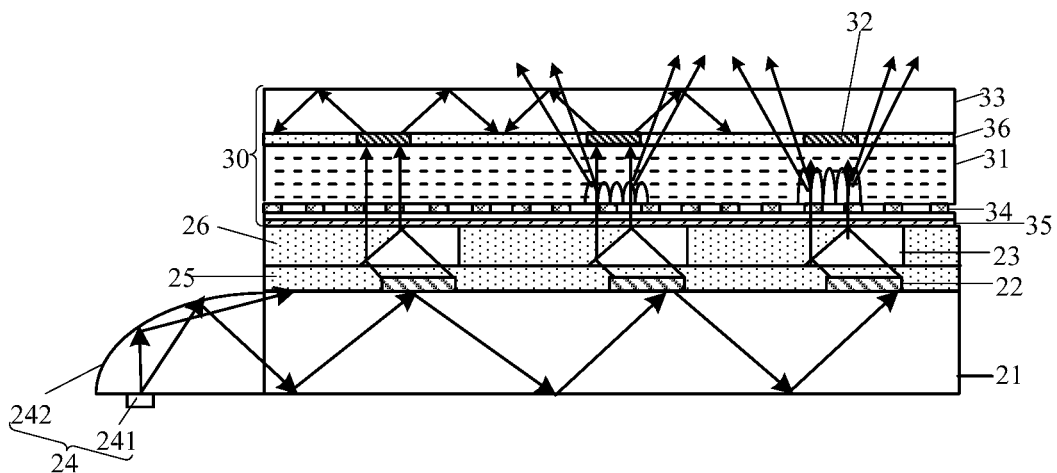
Fig. 7
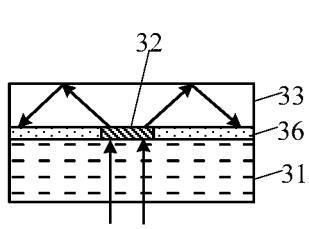   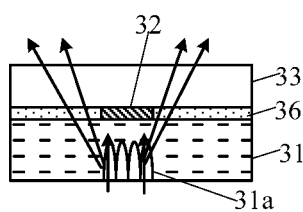   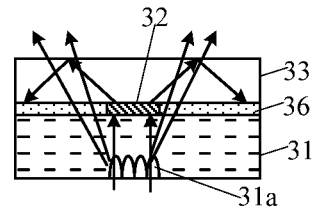
Fig. 8a                Fig. 8b                Fig. 8c
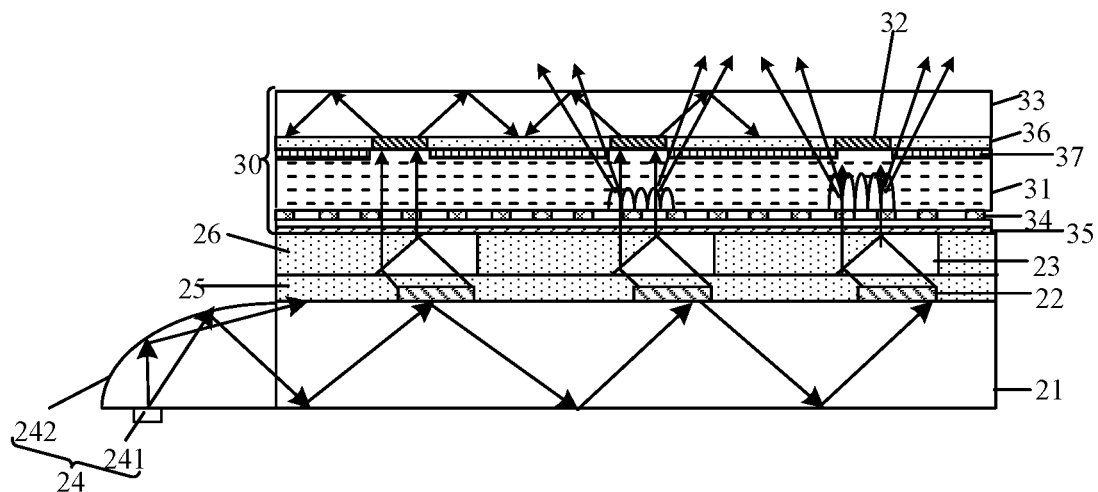
Fig. 9

BACKLIGHT ASSEMBLY, A DISPLAY DEVICE AND A DRIVING METHOD THEREOF

TECHNICAL FIELD

The disclosure herein relates to technical field of display, particularly relates to a backlight assembly, a display device and a driving method thereof.

BACKGROUND

In an existing transparent display device, a light-extracting grating is arranged on a light output surface of a light guide, so that light propagates inside the light guide can be perpendicularly extracted. A liquid crystal layer is arranged at a light output side of a backlight assembly. An array of light-shielding layers is arranged at a side of the liquid crystal layer away from the backlight assembly. When display with L0 gray scale is carried out, perpendicular light beam emitted by the light-extracting grating is shielded by the light-shielding layer; when display with L255 gray scale is carried out, a driving voltage is applied to the liquid crystal layer, so that the liquid crystal layer forms a liquid crystal light grating to change direction of the perpendicular light beam, so that light rays are emitted through an interval between the light-shielding layers. By adjusting voltage in the liquid crystal layer, display with different gray scale is achieved.

However, in the transparent display device, when perpendicularly extracting light is carried out by the light-extracting grating, in addition to that light rays emitted perpendicularly, some stray light rays are generated. The stray light rays cannot be shielded by the light-shielding layer, so that the display device cannot be ensured to reach accurate L0 gray scale. Therefore, contrast of the display device is lowered.

SUMMARY

Disclosed herein is a backlight assembly, comprising: a light guide; a first grating on a first surface of the light guide, the first grating having a diffraction direction slanted relative to a thickness direction of the light guide; and a light direction adjuster on a side of the first grating away from the light guide and configured to change diffractive light coming from the first grating to a target direction.

According to an embodiment, the target direction is substantially parallel to the thickness direction of the light guide.

According to an embodiment, the light direction adjuster has a light input surface and a light output surface, the light input surface is positioned to face the first grating to receive the diffractive light, and the light output surface is slanted relative to the light input surface to receive the diffractive light received by the light input surface and output a light beam in the target direction.

According to an embodiment, the backlight assembly further comprises a first filling layer filled around the light direction adjuster. The light direction adjuster has a first refractive index and the first filling layer has a second refractive index smaller than the first refractive index, and the light output surface of the light direction adjuster is slanted relative to the thickness direction of the light guide in a direction opposite the diffraction direction.

According to an embodiment, the diffractive light has a refraction angle on the light input surface of the light direction adjuster satisfying an equation of:

$$0.2 \leq \frac{\cos\theta}{\cos\left[\arctan\left(\frac{\frac{n_1}{n_2} - \cos\theta}{\sin\theta}\right)\right]} * \cos\left[\theta + \arctan\left(\frac{\frac{n_1}{n_2} - \cos\theta}{\sin\theta}\right)\right] \leq 0.8$$

with $\theta$ being the refraction angle, $n_1$ being the first refractive index and $n_2$ being the second refractive index, [0.2, 0.8] being a range of beam shrinkage ratio of the diffractive light.

According to an embodiment, the light direction adjuster is a trapezoid with the light input surface being a bottom surface and the light output surface being a side surface, and an angle between the side surface and bottom surface being:

$$\theta + \arctan\left(\frac{\sin\theta}{n_1/n_2 - \cos\theta}\right)$$

with $\theta$ being the refraction angle, $n_1$ being the first refractive index and $n_2$ being the second refractive index.

According to an embodiment, the backlight assembly further comprises a planarizing layer covering the first grating on a side of the first grating closer to the light direction adjuster.

According to an embodiment, a refractive index of material of the first grating and a refractive index of material of the light direction adjuster are both larger than a refractive index of material of the planarizing layer.

According to an embodiment, the backlight assembly further comprises a light emitter and a light reflector located on a light input side of the light guide. The light reflector is configured to reflect light emitted by the light emitter into the light guide for propagation inside the light guide with total reflection.

Disclosed herein is a display device, comprising any one of the above backlight assemblies, and a display panel located on a light output side of the backlight assembly.

According to an embodiment, the display panel comprises: a liquid crystal layer; a transparent substrate on a side of the liquid crystal layer away from the backlight assembly; and a second grating layer between the liquid crystal layer and the transparent substrate. The second grating layer comprises a plurality of second gratings. Each of the plurality of second gratings corresponds to a corresponding light direction adjuster and has an orthographic projection on the light guide covering an orthographic projection of a light output surface of the corresponding light direction adjuster on the light guide. The plurality of second gratings are configured to couple perpendicular incident light into the transparent substrate for propagation inside the transparent substrate with total reflection.

According to an embodiment, the display panel further comprises an electrode layer. The display panel is divided into a plurality of pixels each having one of the plurality of second gratings. The electrode layer is configured to generate an electrical field inside the liquid crystal layer to adjust a deflection direction of liquid crystal molecules inside the liquid crystal layer and control the electrical field in each pixel independently.

According to an embodiment, the electrode layer comprises a plurality of first electrodes and a second electrode, the plurality of first electrodes correspond to the plurality of pixels and the second electrode is a common electrode shared by the plurality of pixels.

According to an embodiment, the display panel further comprises a second filling layer filled between adjacent second gratings. The second filling layer has a refractive index smaller than a refractive index of the transparent substrate.

According to an embodiment, the display panel further comprises a light filter layer located at a side of the second filling layer away from the transparent substrate and the display panel contains no light-shielding layer.

Disclosed herein is a method of generating backlight for a display device. The method comprises: extracting light from a light guide by a first grating, here, the light is propagated with total reflection inside the light guide, and the light extracted from the light guide has a first direction slanted relative to a thickness direction of the light guide; adjusting, by a light direction adjuster, the light extracted from the light guide to a target direction that is different from the first direction.

According to an embodiment, the target direction is substantially parallel to the thickness direction of the light guide.

According to an embodiment, the method further comprises shrinking a cross-section of the light extracted from the light guide by the light direction adjuster.

According to an embodiment, the method further comprises passing the light extracted from the light guide through a first filling layer at a light output surface of the light direction adjuster. The light direction adjuster has a first refractive index and the first filling layer has a second refractive index smaller than the first refractive index, and the light output surface of the light direction adjuster is slanted relative to the thickness direction of the light guide in a direction opposite the first direction. The light extracted from the light guide has a refraction angle on a light input surface of the light direction adjuster satisfying an equation of:

$$0.2 \leq \frac{\cos\theta}{\cos\left[\arctan\left(\frac{\frac{n_1}{n_2} - \cos\theta}{\sin\theta}\right)\right]} * \cos\left[\theta + \arctan\left(\frac{\frac{n_1}{n_2} - \cos\theta}{\sin\theta}\right)\right] \leq 0.8$$

with $\theta$ being the refraction angle, $n_1$ being the first refractive index and $n_2$ being the second refractive index, [0.2, 0.8] being a range of beam shrinkage ratio of the light extracted from the light guide.

According to an embodiment, the method further comprises passing the light extracted from the light guide through a planarizing layer before entering the light direction adjuster. The first grating and the light direction adjuster each have a refractive index larger than the planarizing layer.

According to an embodiment, the method further comprises: receiving light adjusted by the light direction adjuster in a liquid crystal layer; applying a control voltage to the liquid crystal layer to control a deflection direction of liquid crystal molecules inside the liquid crystal layer; and generating a backlight by passing light from the liquid crystal layer to a second grating or a second filling layer filled between adjacent second gratings.

According to an embodiment, the control voltage applied is a first level of control voltage and the deflection direction of the liquid crystal molecules inside the liquid crystal layer is controlled to direct all light received in the liquid crystal layer to the second grating.

According to an embodiment, the control voltage applied is a second level of control voltage and the deflection direction of the liquid crystal molecules inside the liquid crystal layer is controlled to direct all light received in the liquid crystal layer to the second grating.

According to an embodiment, the control voltage applied is a third level of control voltage and the deflection direction of the liquid crystal molecules inside the liquid crystal layer is controlled to direct a portion of light received in the liquid crystal layer to the second filling layer between adjacent second gratings and rest of light received in the liquid crystal layer to the second grating.

BRIEF DESCRIPTION OF FIGURES

FIG. 7 schematically shows a structural diagram of a display device according to embodiment 2.

FIG. 8a schematically shows a block diagram that a pixel region in a display panel realizes display with L0 state.

FIG. 8b schematically shows a block diagram that a pixel region in a display panel realizes display with L255 state.

FIG. 8c schematically shows a block diagram that a pixel region in a display panel realizes display with an intermediate state.

FIG. 9 schematically shows a structural diagram of a display device according to another embodiment.

DETAILED DESCRIPTION

Figure 1:
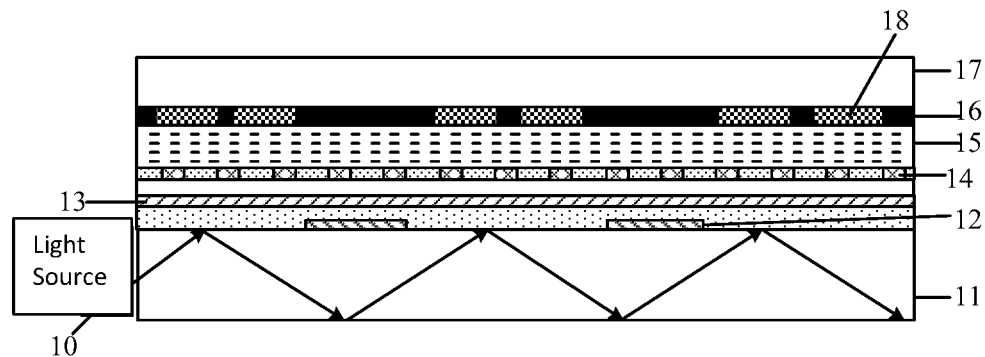
FIG. 1 schematically shows a structural diagram of an existing transparent display device.

FIG. 1 schematically shows a structural diagram of an existing transparent display device. As shown in FIG. 1, the transparent display device comprises a light source 10, a light guide 11, a light-extracting grating 12, a liquid crystal layer 15, a driving electrode layer, an upper substrate 17, a light filter 18 and a light-shielding layer 16. After being coupled into the light guide 11 at a certain central angle, the light source 10 are propagated with total reflection inside the light guide 11. During the process of propagation with total reflection, the light-extracting grating 12 extracts light rays that are propagated with total reflection inside the light guide 11 at an angle perpendicular to the light guide 11. A light-shielding layer 16 is arranged right above the light-extracting grating 12. When the liquid crystal layer 15 does not change light direction, light emitted by the light-extracting grating 12 is shielded by the light-shielding layer 16, so that display with dark state (L0) is realized. When bright state (L255) is displayed, through applying a voltage signal to a common electrode 13 and a pixel electrode 14 of the driving electrode layer, liquid crystal molecules of the liquid crystal layer 15 is oriented to form a liquid crystal light grating. Thus, light rays extracted by the light-extracting grating 12 is deflected when passing through the liquid crystal light grating. They are further emitted through the light filter 18. Through adjusting voltage between the common electrode 13 and the pixel electrode 14, the liquid crystal light grating may have different adjusting effects. Thus, display with multi grey scale is achieved.

Figure 2:
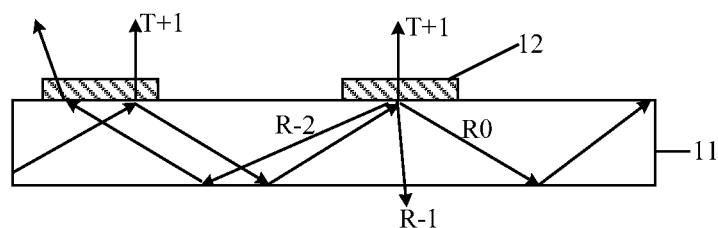
FIG. 2 schematically shows a block diagram for generating stray light by the light-extracting grating of FIG. 1.

However, when light is extracted perpendicularly by the light-extracting grating of the transparent display device in FIG. 1, in addition to that light rays perpendicularly emitted, stray light rays can be generated. The stray light rays cannot be shielded by the light-shielding layer 16. Thus, dark state light leakage occurs. Therefore, contrast of the transparent display device is reduced. FIG. 2 schematically shows a block diagram for generating stray light by the light-extracting grating of FIG. 1. As shown in FIG. 2, when light propagating in the light guide 11 passes through the light-extracting grating 12, besides light perpendicularly emitted upwards with +1 level (namely, T+1 level in FIG. 2), light diffracted by the light-extracting grating 12 comprises light rays diffracted downwards with three diffraction levels: reflected light with 0 level (namely, R0 level in FIG. 2) in the reflected light rays, reflected light with −1 level (namely, R−1 level in FIG. 2) in the reflected light rays, and reflected light with −2 level (namely, R−2 level in FIG. 2) in the reflected light. Here, the angle of the reflected light with 0 level (that is, the angle between the light and the upper surface of the light guide 11) is the same as the angle of the original light (that is, the angle between the light and the upper surface of the light guide), this part of light rays propagate along the original propagation path, subsequent extraction of light is not affected; as to reflected light with −1 level, its angle is close to the angle of light with +1 level, and it can be directly transmitted out from the lower surface of the light guide 11; but as to the reflected light with −2 level, its angle is different from the angle of the original light, and this part of light rays can be reversely propagated inside the light guide 11.

When reflected light with −2 level (R−2 level) generated by the light-extracting grating 12 at the right side of FIG. 2 irradiates the light-extracting grating 12 at the left side, the light-extracting grating 12 can carry out diffraction extraction. Because the angle of the reflected light with −2 level generated by the light-extracting grating 12 at the right side is different from the angle of the original light, the angle of light which is extracted from this part of light by the light-extracting grating 12 at the left side is not perpendicularly upward. The non-perpendicular upward light rays are stray light. The stray light rays are not shielded by the light-shielding layer 16 in FIG. 1. Therefore, dark state light leakage occurs and contrast is reduced.

Figure 3:
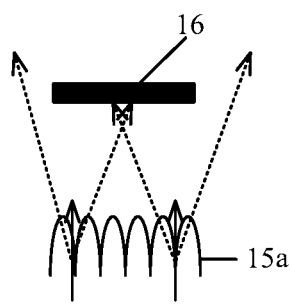
FIG. 3 schematically shows a block diagram for reducing liquid crystal light effect of a transparent display device in the prior art.

In addition, as to a transparent display device, the backlight assembly need to reach enough brightness to be used in a bright environment. In order to improve brightness of the backlight assembly, area for extracting light needs to be increased (that is, area of the region where the light-extracting grating is located). However, when the area for extracting light is increased, region covered by the light-shielding layer 16 is increased correspondingly. Because the liquid crystal light grating 15a has a limited capacity to scatter light, as shown in FIG. 3, if the region for extracting light is increased, then, when a bright state is displayed, portion of the light scattered by the liquid crystal light grating 15a cannot deviate out from the light-shielding layer 16, so that light efficiency of the liquid crystal is low. Further, overall brightness of the transparent display device is still relatively low.

Figure 4:
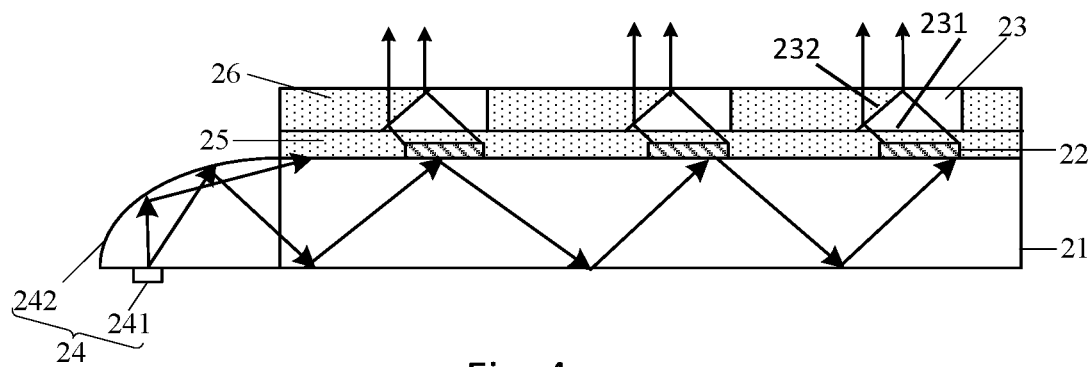
FIG. 4 schematically shows a structural diagram of a backlight assembly according to embodiment 1.
Figure 5:
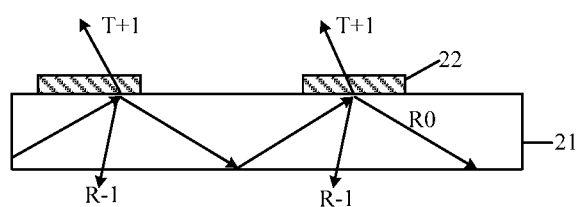
FIG. 5 schematically shows a diagram of an output diffraction light beam and a reflection diffraction light beam generated by a first grating.

Embodiment 1 is an exemplary embodiment that provides a backlight assembly. FIG. 4 schematically shows a structural diagram of the backlight assembly according to embodiment 1. As shown in FIG. 4, the backlight assembly comprises a light guide 21, a first grating 22 and a light direction adjuster 23. The light guide 21 comprises a first surface and a second surface which are oppositely arranged (an upper surface and a lower surface of the light guide 21 in FIG. 4). The first grating 22 is arranged on the first surface of the light guide 21. The first grating 22 is used for carrying out diffraction of light rays propagated with total reflection inside the light guide 21, to generate diffraction light beam. It should be understood that while the first grating 22 generates an output diffraction beam, a reflection diffraction beam is also generated. FIG. 5 schematically shows a diagram of an output diffraction beam and a reflection diffraction light beam generated by the first grating. As shown in FIG. 5, output direction of the output diffraction light beam is slanted relative to a thickness direction of the light guide 21. Part of the reflection diffraction light beam is propagated with total reflection along the original propagation path. The rest of the reflection diffraction light grating is emitted from the second surface of the light guide 21. Referring to FIG. 4, each of the light direction adjusters 23 corresponds to a first grating 22. The light direction adjuster 23 may be a light direction adjusting lens and is arranged at a side of corresponding first grating 22 away from the light guide 21. The light direction adjuster 23 is used for deflecting the diffraction light beam emitted by the first grating 22 into a collimated light beam along a target direction.

The light guide 21 further comprises a light input surface 231 which is positioned between the first surface and the second surface of the light guide 21 (left side surface of the light guide 21 in FIG. 4). Light rays propagated with total reflection inside the light guide 21 are provided by a light source 24 arranged at the side of the light input surface 231. As shown in FIG. 4, the light source 24 comprises a light-emitting element 241 and a light-reflecting element 242. The light-emitting element 241 may be a single-color LED lamp. To ensure enough high collimation degree, size of the LED lamp may be as small as possible. In an embodiment, a micro-LED lamp or a micro-OLED etc., may be used. In one embodiment, it may be a laser light source. The light-reflecting element 242 is used for reflecting light emitted by the light-emitting element 241 toward the light input surface 231 of the light guide 21, so that light rays of the light-emitting element 241 enter into the light guide 21 with a preset angle from the light input surface 231 of the light guide 21, and are propagated with total reflection inside the light guide 21.

The backlight assembly may be used in a display device. In an embodiment, a liquid crystal display panel may be arranged at a light output side of the backlight assembly (namely, a side of the light direction adjuster 23 away from the light guide 21). By controlling deflection angle of liquid crystal molecules of the liquid crystal layer, light rays emitted by the backlight assembly may irradiate the light-shielding layer of the liquid crystal display panel in the target direction, realizing display with dark state. Or, light rays emitted by the backlight assembly deviate from the target direction under action of the liquid crystal molecules and are emitted from an interval between the light-shielding layers, realizing display with bright-state display.

Of course, the display device is not limited to use the above way of setting the light-shielding layer to achieve display with gray scale. Other ways may also be used to achieve the effect that light rays of the backlight assembly are controlled and cannot be emitted from the liquid crystal display panel at dark state. Detailed description will be given below. No redundant description is given here.

In order to conveniently control gray scale of the display device, in an embodiment, the above target direction is substantially parallel to the thickness direction of the light guide. For example, the target direction may be within 10°, 5°, or 2° degrees from the thickness direction of the light guide. That is, the light direction adjuster adjusts the direction of the diffraction light beam emitted by the first grating to be perpendicular to the first grating or almost perpendicular to the first grating.

Compared with a light-extracting grating in the prior art, the light rays extracted from the light guide 21 by the first grating 22 in the backlight assembly according to an embodiment do not emit perpendicularly. Instead, there exists a slanted angle relative to the perpendicular direction (namely, the thickness direction of the light guide). In an embodiment, the grating period of the first grating 22 is shorter than the grating period of the existing light-extracting grating 12. When the slanted angle reaches a certain value, the grating period of the first grating 22 needs to be small enough. As to the first grating 22 with a small period, its reflection diffraction light beam does not have components with −2 level. It only has component with 0 level and component with −1 level. Here, the component with 0 level propagates in the light guide 21 according to the original propagation path, the component with −1 level emits from the light guide 21, therefore, portion of light reflected by a certain first grating 22 can be prevented from being reflected by the second surface of the light guide 21 to other first gratings 22. Thus, stray light deviating from the target direction can be prevented from occurring.

In one embodiment, in order to conveniently set the light direction adjuster 23, as shown in FIG. 4, the backlight assembly further comprises a planarizing layer 25 around the first grating 22. The light direction adjuster 23 is arranged on a surface of the planarizing layer 25 away from the first grating 22. Here, part of the planarizing layer 25 covers the first grating 22. The other part is located on the surface of the light guide 21. In order to ensure that light in the light guide 21 can be totally reflected at a position where first gratings 22 are not arranged, and to improve diffraction efficiency of the first grating 22 at the same time, in one embodiment, the refractive index of the material of the light guide 21 and the refractive index of the material of the first grating 22 both may be larger than the refractive index of the material of the planarizing layer 25.

In a manufacturing process, the grating period of the first grating 22 may be designed according to the below equation of the grating period:

$$n_i \sin \theta_i - n_d \sin \theta_d = m\lambda/P \qquad (1)$$

Here, $n_i$ is the refractive index of the medium where incident light travels through. In one embodiment, it is the refractive index of the material of the light guide 21; $\theta_i$ is the incident angle of light rays incident upon the first grating 22; $n_d$ is the refractive index of a medium where output diffraction light travels through; $\theta_d$ is a diffraction angle; m is a diffraction order which may be +1 or −1; λ is the light wavelength; P is the period of the first grating 22. It should be understood that an incident angle in one embodiment is the angle between an incident light ray and the normal of the light input surface 231. In one embodiment, $\theta_i$ is the angle between the light ray incident upon the first grating 22 and the thickness direction of the light guide 21. In addition, a reflection angle in an embodiment is the angle between a reflected light ray and the normal of a reflection surface. A refraction angle in one embodiment is the angle between a refractive light ray and the normal of an interface where refraction occurs.

When m is set to be 1, based on required angle of the output diffraction light ray and the above equation (1), period P of the first grating 22 is determined. In an embodiment, the diffraction angle $\theta_d$ and the period P of the first grating 22 may satisfy the following condition: $0°<\theta_d<90°$, $\theta_d$ and P satisfy the above equation (1). According to the period P and the above equation (1), it may be obtained through calculation that: except component with 0 level, components with other levels in the reflection diffraction light beam of the first grating 22 is emitted from the light guide 21. In an embodiment, the refractive index of the material of the light guide 21 is 1.52; the refractive index of the material of the planarizing layer 25 is 1.25; wavelength λ of the light which is propagated with total reflection inside the light guide 21 is equal to 525 nm, incident angle $\theta_i=65°$ when light rays irradiate the first grating 22; output angle of light with +1 level transmission light is $\theta_d=35°$, in addition, the output diffraction light beam and the incident light are located at a same side of the normal. Then, according to calculation of the above equation (1), it can be obtained that: the period P of the first grating 22 is equal to 251 nm. After the period P of the first grating 22 is determined, angle of light with each level in the diffractive light beam can be further calculated. In an embodiment, m=1, $\theta_i=65°$, $n_i=1.52$, $n_d=1.52$, P=251 nm, according to the above equation (1), it can be obtained that: $\theta_d=34.8°$. Assume m=0, P=251 nm, $\theta_i=65°$, $n_i=n_d=1.52$, then, according to the above equation (1), it can be obtained that $\theta_d=28°$. When m is other integers, there is no solution for $\theta_d$. In other words, output angle of light with +1 level in the output diffraction light beam is 34.8°, the reflection angle of 0 level light in the reflection diffraction light beam is 65° and the reflection diffraction light beam still propagates inside the light guide 21 along the original propagation path; reflection angle of light with −1 level in the reflection diffraction light beam is 28° without reaching the critical angle (55°) of the total reflection, so that it is emitted from the light guide 21.

In the embodiment, there may be a plurality of the first gratings 22 and a plurality of the light direction adjuster 23. They both are arranged in a dot array. A first filling layer 26 may arranged between different light direction adjusters 23 (filling the space between adjacent light direction adjusters 23).

Figure 6:
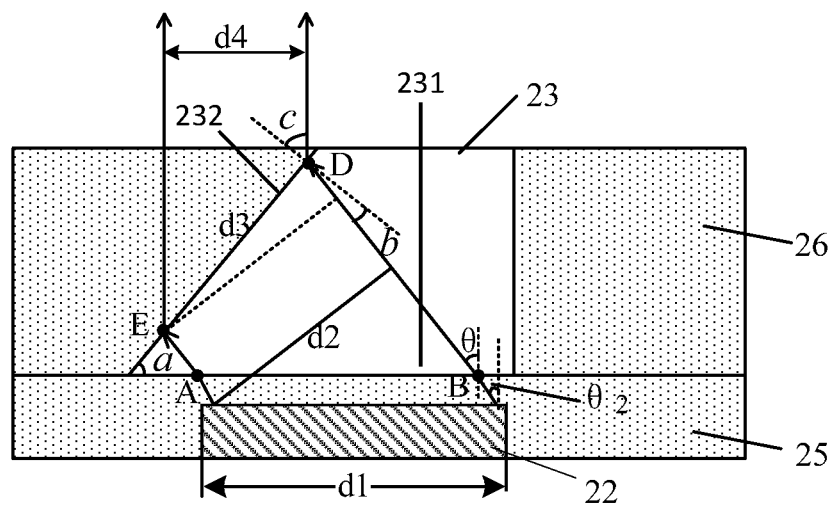
FIG. 6 schematically shows a diagram of direction change of an output diffraction light beam emitted by a first grating after passing through a light direction adjuster.

FIG. 6 schematically shows a diagram of direction change of a diffraction light beam emitted by the first grating after passing through the light direction adjuster. As shown in FIG. 6, the light direction adjuster 23 comprises a light input surface 231 (namely, a lower surface of the light direction adjuster 23 in FIG. 6) and a light output surface 232 (namely, a slanted side surface of the light direction adjuster 23 in FIG. 6). The light input surface 231 of the light direction adjuster 23 faces the corresponding first grating 22, to receive transmission diffraction light beam. The light output surface 232 of the light direction adjuster 23 is slanted relative to the light input surface 231 of the light direction adjuster 23, to receive light beam received at the light input surface 231 and emit a collimated light beam which is perpendicular to the first grating 22.

In FIG. 6, assume that the slanted angle of the transmission diffraction light beam emitted by the first grating 22 is $\theta_2$; the refractive index of the material of the light direction adjuster 23 is $n_1$; the refractive index of the material of the planarizing layer 25 is $n_3$. According to the equation for refractive index, relation between the refraction angle $\theta$ and the slanted angle $\theta_2$ when the transmission diffraction light beam is incident upon the light direction adjuster 23 can be obtained as:

$$n_3 \sin \theta_2 = n_1 \sin \theta \qquad (2)$$

When $n_1=1.9$, $n_3=1.25$, several groups of specific numerical values for $\theta$ and $\theta_2$ may be obtained as shown in the following table 1:

TABLE 1

| $\theta_2$ | $\theta$ |
|---|---|
| 20° | 13.0° |
| 30° | 19.2° |
| 35° | 22.2° |
| 40° | 25° |

When the light output surface 232 of the light direction adjuster 23 emits a collimated light beam perpendicular to the surface on which the first grating 22 are located, according to the geometrical relation in FIG. 6, relation between an angle $\alpha$, which is between the light output surface 232 and the light input surface 231 of the light direction adjuster 23, and the refraction angle $\theta$ is obtained as follows:

$$a = \theta + b = \theta + \arctan\left(\frac{\sin\theta}{n_1/n_2 - \cos\theta}\right) \qquad (3)$$

Here, $n_2$ is the refractive index of the material of the first filling layer 26. In one embodiment, according to required slanted angle $\theta_2$ of the output diffraction light beam and the above equation (2) and (3), slanted angle $\alpha$ of the light output surface 232 may be determined.

In order to improve overall brightness of the display device when a bright state is displayed, in one embodiment, $n_1 > n_2$; slanted direction of the light output surface 232 of the light direction adjuster 23 may be different from the slanted direction of the diffraction light beam. That is, when the output diffraction light beam shows "\" in FIG. 6 (namely, slanted towards right), the light output surface 232 of the light direction adjuster 23 shows "/" (namely, slanted towards left); alternatively, the out diffraction light beam is in a left slanted state, the light output surface 232 of the light direction adjuster 23 is in a right slanted state.

In one embodiment, as shown in FIG. 6, the two ends of the irradiation region are respectively point A and point B when the diffraction light beam is incident upon the light input surface 231 of the light direction adjuster 23. The two ends of the irradiation region are respectively point E and point D when the diffraction light beam is further incident upon the light output surface 232. Assume the horizontal distance between the point A and the point E is L1, the horizontal distance between the point B and the point D is L2, the horizontal distance between the point A and the point D is L3, then, light extraction width of the first grating 22 is d1=L2+L3, the width d4 of the collimated light beam emitted by the light direction adjuster 23 is equal to L1+L3; Because L1<L2, thus, d4<d1. That is, while the light direction adjuster 23 adjusts the output diffraction light beam to be a collimated light beam perpendicular to the first grating 22, it further plays a role of beam shrinkage for shrinking a cross-section of the diffraction light beam. Therefore, compared with the prior art, embodiments may improve liquid crystal light efficiency while ensuring that backlight light effect is achieved. Thus, overall brightness of the display device for displaying a bright state is improved. In addition, the light direction adjuster 23 has a simple structure, and is easy to produce. The shape of the light direction adjuster 23 is shown in FIG. 6. It is a block-shaped structure with longitudinal cross section being a right-angled trapezoid. In other embodiments, the light direction adjustor 23 may have other shapes as far as the light input surface 231 and the light output surface 232 satisfy the above description.

In FIG. 6, relations among $d_1$, $d_2$, $d_3$ and $d_4$ are as follows:

$$d_2/d_1 = \cos\theta$$
$$d_3 = d_2/\cos b = d_1 \cos\theta/\cos b$$
$$d_4 = d_3 \cos a = \frac{d_1 \cos\theta}{\cos b} \cos a$$

Based on $d_1$, $d_2$, $d_3$, $d_4$ and the above equation (3), it can be obtained that:

$$\frac{d_4}{d_1} = \frac{\cos\theta}{\cos b}\cos a = \qquad (4)$$

$$\frac{\cos\theta}{\cos\left[\arctan\left(\frac{n_1/n_2 - \cos\theta}{\sin\theta}\right)\right]} * \cos\left[\theta + \arctan\left(\frac{n_1/n_2 - \cos\theta}{\sin\theta}\right)\right]$$

Here, $d_4/d_1$ is beam-shrinkage ratio of the light direction adjuster 23. Optionally, in one embodiment, the material of the first filling layer 26 is the same as the material of the planarizing layer 25. That is, $n_2=n_3$. Table 2 gives beam shrinkage ratios of the light direction adjuster 23 corresponding to different values of $\theta$.

TABLE 2

| $\theta$ | $d_4/d_1$ |
|---|---|
| 10° | 0.88 |
| 15° | 0.73 |
| 20° | 0.51 |
| 25° | 0.2 |

In the embodiment, the refraction angle $\theta$ is configured so that the range of the beam shrinkage ratio is between [0.2, 0.8]. In an embodiment, $\theta$ is set to be 25°, so that a beam shrinkage ratio which is 0.2 is achieved.

FIG. 7 schematically shows a structural diagram of a display device according to embodiment 2. Embodiment 2 is an exemplary embodiment and as shown in FIG. 7, the display device comprises a display module according to embodiment 1 and a display panel 30 which is arranged at a light output side of the display module. The light output side of the display module is a side of the light direction adjuster 23 away from the light guide 21.

Here, the display panel is divided into a plurality of pixel regions. Each pixel region comprises a light transmitting region and a light-shielding sub region. Each of the light direction adjusters may correspond to a pixel region. The display panel 30 comprises a liquid crystal layer 31, a transparent substrate 33, a second grating layer and a driving electrode layer. The transparent substrate 33 is arranged at a side of the liquid crystal layer 31 away from the backlight assembly. The second grating layer is arranged between the transparent substrate 33 and the liquid crystal layer 31.

The second grating layer comprises a plurality of second gratings 32 arranged with intervals. Each light-shielding region is provided with a second grating 32. The light transmitting region corresponds to an interval between adjacent second light-extracting gratings 32. Each of the second gratings 32 corresponds to a light direction adjuster 23. The orthographic projection of the second grating 32 on the light guide 21 covers the orthographic projection of the light output region of the light direction adjuster 23 on the light guide 21. The second grating 32 is used for coupling perpendicularly incident light rays into the transparent substrate 33 to carry out propagation with total reflection. The second grating 32 may be a multi-step light grating, a shining light grating or a slanted light grating.

According to the above equation (1), it may be obtained that: in order to enable the light rays of the second grating 32 coupled into the transparent substrate 33 be totally reflected inside the transparent substrate 33, the period P' of the second grating 32 may satisfy P'<λ/(n$_4$*sin C), here, n$_4$ is the refractive index of the material of the transparent substrate 33. C is the critical angle of the total reflection for light rays inside the transparent substrate 33.

The driving electrode layer is used for generating an electric field in the liquid crystal layer 31 to adjust light deflection direction of the liquid crystal layer 31. Thus, direction of the incident light is adjusted by using the liquid crystal layer 31. Further, the light rays are perpendicularly incident upon the second grating 32 or irradiates an interval between the second gratings 32. Here, electric fields applied to each pixel region by the driving electrode layer may be independently controlled, so that electric fields of the pixel regions do not influence each other. Therefore, adjustment of the light rays by liquid crystals in each pixel region does not influence each other.

As shown in FIG. 7, the drive electrode layer may comprise a plurality of first electrodes 34 and at least one second electrode 35. The first electrodes 34 and the second electrodes 35 are separated and insulated. Each of the first electrodes 34 is separated from each other. Each of the first electrodes corresponds to a pixel region and may be referred to as a pixel electrode. In one embodiment, the second electrode 35 may be a planar electrode and also a common electrode shared by all pixels. The first electrode 34 is located between the second electrode 35 and the liquid crystal layer 31. During operation, different levels of control voltages may be applied to adjust the deflection direction of liquid crystal molecules in the liquid crystal layer to achieve the various displaying states of L0 through L255.

The second filling layer 36 may be arranged between adjacent second gratings 32, in order to ensure that: after the second grating 32 couples perpendicularly incident light rays into the transparent substrate 33, the light rays may be propagate with totally reflection inside the transparent substrate 33. In one embodiment, the refractive index of the material of the second filling layer 36 is smaller than that of the material of the transparent substrate 33.

FIG. 8a schematically shows a block diagram for displaying state L0 by a pixel region in a display panel. With reference to FIG. 7 and FIG. 8a, when display with L0 state is carried out, the liquid crystal layer 31 does not change the direction of a collimated light beam emitted by the light direction adjuster 23. Thus, the collimated light beam is perpendicularly incident upon the second grating 32. Further, the light beam is coupled into the transparent substrate 33 by the second grating 32 for propagation inside the transparent substrate with total reflection. At this time, there is no output of light rays of the backlight assembly at the corresponding pixel region which is in a dark state.

FIG. 8b is block diagram for displaying L255 state by a pixel region in a display panel. With reference to FIG. 7 and FIG. 8b, when display with L255 state is carried out, the driving electrode layer drives liquid crystals to change its deflection direction. A liquid crystal light grating 31a is formed. The liquid crystal light grating 31a performs diffraction for the collimated light beam emitted by the light direction adjuster 23, to scatter the collimated light beam and cause the diffractive light rays to deviate from the region where the second grating 32 is located. Here, The role of the liquid crystal light grating 31a on the collimated light beam may satisfy that the diffractive light rays deviate from the second grating 32. Moreover, when the diffractive light rays transmit through the second filling layer 36 to be incident upon a surface of the transparent substrate 33 facing the liquid crystal layer 31, the refraction angle at the surface may be smaller than the critical angle of the total reflection at the interface between the transparent substrate 33 and the air layer, so that the diffractive light rays pass through the transparent substrate 33 to reach a human eye, to display the L255 state for the pixel region.

FIG. 8c is a block diagram for a pixel region in a display panel to display an intermediate gray state. With reference to FIG. 7 and FIG. 8c, when display with an intermediate state between L0 state and L255 state is carried out, the driving electrode layer drives liquid crystals to change deflection direction to form a liquid crystal light grating 31a. In addition, the liquid crystal light grating 31a causes portion of light rays in the collimated light beam emitted by the light direction adjuster 23 to keep its original direction and perpendicularly incident upon the second grating 32, and causes the other portion of light rays in the collimated light beam to deviate from the original direction and to irradiate region outside the region where the second grating 32 is located. Similar to realization of the L255 state, the light rays deviating from the original direction pass through the transparent substrate 33 to reach a human eye; the light rays keeping the original direction is the same as that when L0 state is realized, that is, they are coupled into the transparent substrate 33 by the second grating 32 for propagation inside the transparent substrate with total reflection, so that they cannot be received by a human eye. In this way, display with an intermediate state may be realized.

FIG. 9 schematically shows a structural diagram of a display device according to another exemplary embodiment. Compared to the embodiment shown in FIG. 7, the embodiment showing in FIG. 9 may be identical to the embodiment of FIG. 7 except for an additional light filter layer 37. The light filter layer 37 may locate on a side of the second filling layer 36 away from the transparent substrate 33. There is no light-shielding layer in either the embodiment of FIG. 7 or the embodiment of FIG. 9.

In one embodiment, the display device may be used as a transparent display device. Non-transparent structures such as a back plate are not needed at a side of the backlight assembly opposite the display panel. In order to improve transparency degree of the display device, the first grating 22 and the second grating 32 may made of transparent materials. Compared with the display device of FIG. 1, the display device of FIG. 1 uses the light-shielding layer 16 to realize display with dark state, transparency degree of the display device can be reduced due to effect of absorption of light by the light-shielding layer 16; however, the display device according to an embodiment may use a transparent second grating 32 to replace the light-shielding layer 16, so that transparency degree of the display device may be improved.

Embodiment 3 is an exemplary embodiment that provides a driving method of the above display device, comprising: driving the backlight assembly to provide a collimated light beam along the target direction for the display panel.

Because there are no stray light rays in the light rays provided by the above backlight assembly, there is no light leakage when display with L0 state is carried out by the display device of the above backlight assembly, so that contrast of the display device may be improved.

Further, the driving method comprises:

When display with L0 state is carried out, a first level of control voltage may be applied to adjust deflection direction of liquid crystal in the liquid crystal layer, so that the collimated light beam is perpendicularly incident upon the second grating and is further coupled into the transparent substrate by the second grating for propagation with total reflection inside the transparent substrate.

When display with L255 state is carried out, a second level of control voltage may be applied to adjust deflection direction of liquid crystal in the liquid crystal layer, so that all of the collimated light beam emits toward intervals between the second gratings and further passes through the transparent substrate to emit out.

To display an intermediate state between L0 state and L255 state, a third level of control voltage may be applied to adjust deflection direction of liquid crystal molecules in the liquid crystal layer, so that one part of the collimated light beam is perpendicularly incident upon the second grating, the other part emits toward interval regions between the second gratings, further, a part of light rays are coupled into the transparent substrate by the second grating for propagation inside the transparent substrate with total reflection, the other part passes through the transparent substrate to emit out.

Specific embodiments for realizing L0 state, L255 state and an intermediate state may have already been described above with reference to the accompanying drawings. No redundant description is given here again.

Above is description for the backlight assembly, the display device and the driving method thereof according to one embodiment. No stray light is generated by the backlight assembly according to one embodiment, so that there is no light leakage when the display device is in L0 state, further, contrast of the display device is improved. In addition, the light direction adjuster in the backlight assembly may shrink a cross-section of the light beam extracted from the light guide, liquid crystal light efficiency is further improved while backlight light effect is unchanged, further, overall light efficiency of the display device is improved. In addition, no light-shielding layer is arranged in the display device, instead, perpendicularly incident light beam is shielded by a second grating which is transparent, so that transparency degree of the display device is improved.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A display device, comprising a backlight assembly, and a display panel located on a light output side of the backlight assembly;
   wherein the backlight assembly comprises:
      a light guide;
      a first grating on a first surface of the light guide, the first grating having a diffraction direction slanted relative to a thickness direction of the light guide; and
      a light direction adjuster on a side of the first grating away from the light guide and configured to change diffractive light coming from the first grating to a target direction,
   wherein the display panel comprises:
      a liquid crystal layer;
      a transparent substrate on a side of the liquid crystal layer away from the backlight assembly; and
      a second grating layer between the liquid crystal layer and the transparent substrate,
   wherein the second grating layer comprises a plurality of second gratings, each of the plurality of second gratings corresponds to a corresponding light direction adjuster and has an orthographic projection on the light guide covering an orthographic projection of a light output surface of the corresponding light direction adjuster on the light guide, the plurality of second gratings are configured to couple perpendicular incident light into the transparent substrate for propagation inside the transparent substrate with total reflection.

2. The backlight assembly of claim 1, wherein the target direction is substantially parallel to the thickness direction of the light guide.

3. The backlight assembly of claim 2, wherein the light direction adjuster has a light input surface and a light output surface, the light input surface is positioned to face the first grating to receive the diffractive light, and the light output surface is slanted relative to the light input surface to receive the diffractive light received by the light input surface and output a light beam in the target direction.

4. The backlight assembly of claim 3, wherein the backlight assembly further comprises a first filling layer filled around the light direction adjuster, wherein the light direction adjuster has a first refractive index and the first filling layer has a second refractive index smaller than the first refractive index, and the light output surface of the light direction adjuster is slanted relative to the thickness direction of the light guide in a direction opposite the diffraction direction.

5. The backlight assembly of claim 4, wherein the diffractive light has a refraction angle on the light input surface of the light direction adjuster satisfying an equation of:

$$0.2 \leq \frac{\cos\theta}{\cos\left[\arctan\left(\frac{\frac{n_1}{n_2} - \cos\theta}{\sin\theta}\right)\right]} * \cos\left[\theta + \arctan\left(\frac{\frac{n_1}{n_2} - \cos\theta}{\sin\theta}\right)\right] \leq 0.8$$

with $\theta$ being the refraction angle, $n_1$ being the first refractive index and $n_2$ being the second refractive index, [0.2, 0.8] being a range of beam shrinkage ratio of the diffractive light.

6. The backlight assembly of claim 5, wherein the light direction adjuster is a trapezoid with the light input surface being a bottom surface and the light output surface being a side surface, and an angle between the side surface and bottom surface being:

$$\theta + \arctan\left(\frac{\sin\theta}{n_1/n_2 - \cos\theta}\right)$$

with θ being the refraction angle, $n_1$ being the first refractive index and $n_2$ being the second refractive index.

7. The backlight assembly of claim 1, further comprising a planarizing layer covering the first grating on a side of the first grating closer to the light direction adjuster.

8. The backlight assembly of claim 7, wherein a refractive index of material of the first grating and a refractive index of material of the light direction adjuster are both larger than a refractive index of material of the planarizing layer.

9. The backlight assembly of claim 1, further comprising a light emitter and a light reflector located on a light input side of the light guide, wherein the light reflector is configured to reflect light emitted by the light emitter into the light guide for propagation inside the light guide with total reflection.

10. The display device of claim 1, wherein the display panel further comprises an electrode layer, the display panel is divided into a plurality of pixels each having one of the plurality of second gratings, the electrode layer is configured to generate an electrical field inside the liquid crystal layer to adjust a deflection direction of liquid crystal molecules inside the liquid crystal layer and control the electrical field in each pixel independently.

11. The display device of claim 10, wherein the electrode layer comprises a plurality of first electrodes and a second electrode, the plurality of first electrodes correspond to the plurality of pixels and the second electrode is a common electrode shared by the plurality of pixels.

12. The display device of claim 1, wherein the display panel further comprises a second filling layer filled between adjacent second gratings, the second filling layer has a refractive index smaller than a refractive index of the transparent substrate.

13. The display device of claim 12, wherein the display panel further comprises a light filter layer located at a side of the second filling layer away from the transparent substrate and the display panel contains no light-shielding layer.

14. A method of generating backlight for the display device of claim 1, the method comprising:
   extracting light from the light guide by the first grating, wherein the light is propagated with total reflection inside the light guide, and the light extracted from the light guide has a first direction slanted relative to a thickness direction of the light guide;
   adjusting, by the light direction adjuster, the light extracted from the light guide to the target direction that is different from the first direction.

15. The method of claim 14, further comprising:
   receiving light adjusted by the light direction adjuster in the liquid crystal layer;
   applying a control voltage to the liquid crystal layer to control a deflection direction of liquid crystal molecules inside the liquid crystal layer; and
   generating a backlight by passing light from the liquid crystal layer to the second grating or a second filling layer filled between adjacent second gratings.

16. The method of claim 15, wherein the control voltage applied is a first level of control voltage and the deflection direction of the liquid crystal molecules inside the liquid crystal layer is controlled to direct all light received in the liquid crystal layer to the second grating.

17. The method of claim 15, wherein the control voltage applied is a second level of control voltage and the deflection direction of the liquid crystal molecules inside the liquid crystal layer is controlled to direct all light received in the liquid crystal layer to the second grating.

18. The method of claim 15, wherein the control voltage applied is a third level of control voltage and the deflection direction of the liquid crystal molecules inside the liquid crystal layer is controlled to direct a portion of light received in the liquid crystal layer to the second filling layer between adjacent second gratings and rest of light received in the liquid crystal layer to the second grating.

* * * * *